United States Patent

Clark

[15] 3,684,299

[45] Aug. 15, 1972

[54] CARTRIDGE LOCKING AND EJECTOR MECHANISM

[72] Inventor: Alfred J. Clark, Palatine, Ill.

[73] Assignee: Motorola, Inc., Franklin Park, Ill.

[22] Filed: Feb. 8, 1971

[21] Appl. No.: 113,533

[52] U.S. Cl. ....................................................274/4 B
[51] Int. Cl. ....................................................G11b 5/00
[58] Field of Search ........274/4 B, 11 B; 179/100.2 Z

[56] References Cited

UNITED STATES PATENTS

| | | | |
|---|---|---|---|
| 3,485,500 | 12/1969 | Loeschner et al | 274/11 B |
| 3,492,005 | 1/1970 | Veno et al | 274/4 B |

*Primary Examiner*—Harry N. Haroian
*Attorney*—Vincent Rauner and R. J. Laporte

[57] ABSTRACT

A cartridge locking and ejector mechanism for use in a tape player includes a pivotally mounted ejector arm movable from a first to a second position and resiliently biased to the first position. A linkage includes a first arm mounted for pivotal movement about a first point and engageable with the ejector arm, a second arm pivotal about the same point and having a projection extending into the path of a cartridge received in the tap player and a third arm pivotally mounted on the first arm and releasably interconnecting the first and second arms. A cartridge inserted into the player engages the projection, causing the linkage to move the ejector arm to the second position whereat a solenoid operated latching assembly secures the ejector arm. Further insertion of the cartridge to its fully inserted position in the player, disconnects the first and second arms permitting the second arm to move with the cartridge. Upon reaching a fully inserted position in the player, a spring biased roller is received in a notch in the cartridge wall to maintain the cartridge secured in the player. Deenergization of the solenoid releases the ejector arm, causing the ejection of the cartridge from the player.

12 Claims, 5 Drawing Figures

PATENTED AUG 15 1972 3,684,299

INVENTOR
ALFRED J CLARK
BY Ronald J. LaPorte
ATTORNEY

INVENTOR
ALFRED J CLARK
BY
Ronald J. LaPorte
ATTORNEY

CARTRIDGE LOCKING AND EJECTOR MECHANISM

BACKGROUND OF THE INVENTION

This invention relates generally to cartridge locking and ejector mechanisms and more particularly to such a mechanism for use in a cartridge type tape player.

It is desirable in tape players wherein tape cartridges are received for the purpose of reproducing the sound recorded thereon to include means for firmly positioning the cartridge in engagement with instrumentalities for driving the tape through the cartridge and ejecting the cartridge from the player when the player is rendered inoperative. A tape cartridge and ejector mechanism which performs the above described functions is illustrated in U. S. Pat. No. 3,485,000, assigned to the same assignee as the instant invention. While the locking and ejector mechanism of the patent is efficient in operation, it does not automatically eject the cartridge from the player when the operation of the latter is discontinued. Rather it requires electrical power to operate the mechanisms which in turn bring about the ejection of the cartridge from the player.

In some cases, it is not advantageous or desirable to provide such power for this purpose.

SUMMARY OF THE INVENTION

Accordingly, it is a primary object of the present invention to provide a new and improved cartridge locking and ejector mechanism for a cartridge tape player which requires no electrical power to eject a cartridge from the player.

It is another object of this invention to provide a cartridge locking and ejector mechanism of the above described type wherein the cartridge is ejected automatically upon the removal of electrical power therefrom.

It is still another object of the invention to provide a cartridge locking and ejector mechanism which is efficient in operation.

Briefly, a preferred embodiment of the cartridge locking and ejector mechanism according to the invention comprises a pivotally mounted ejector arm which is spring biased to a first position when no cartridge is inserted into the cartridge receiving tunnel of the tape player in which the locking and ejector mechanism is incorporated. A linkage including a plurality of pivotally mounted arm members is mounted adjacent the free end of the ejector arm with a first one of the linkage arms being in engagement therewith. A second one of the linkage arms is mounted for pivotal movement about the same pivot point as the first linkage arm and includes a projection extending into the cartridge receiving tunnel in the path of a cartridge. The first and second arms are interconnected by a third arm pivotally mounted to the first mentioned linkage arm.

Upon insertion of a cartridge into the tunnel of the player in engagement with the projection of the second linkage arm, the last mentioned arm is moved from a first to a second position and the ejector arm is moved against the spring bias to a second position where it is latched by means of a solenoid operated assembly. Full insertion of the cartridge into the tunnel against the projection causes the disconnection of the interconnecting arm with respect to the first and second linkage arms, permitting additional movement of the second linkage arm to a third position. When fully inserted into the tape player, a spring biased roller member is received in a notch in the cartridge wall to secure the cartridge in the fully inserted position in the player.

Disconnection of power to the solenoid causes the ejector arm to be returned by the spring bias to its first or home position. The ejector arm engages the first linkage arm which in turn engages the second linkage arm, returning the linkage to its original position while ejecting the cartridge from the tape player.

DETAILED DESCRIPTION

Figures 1, 1A:
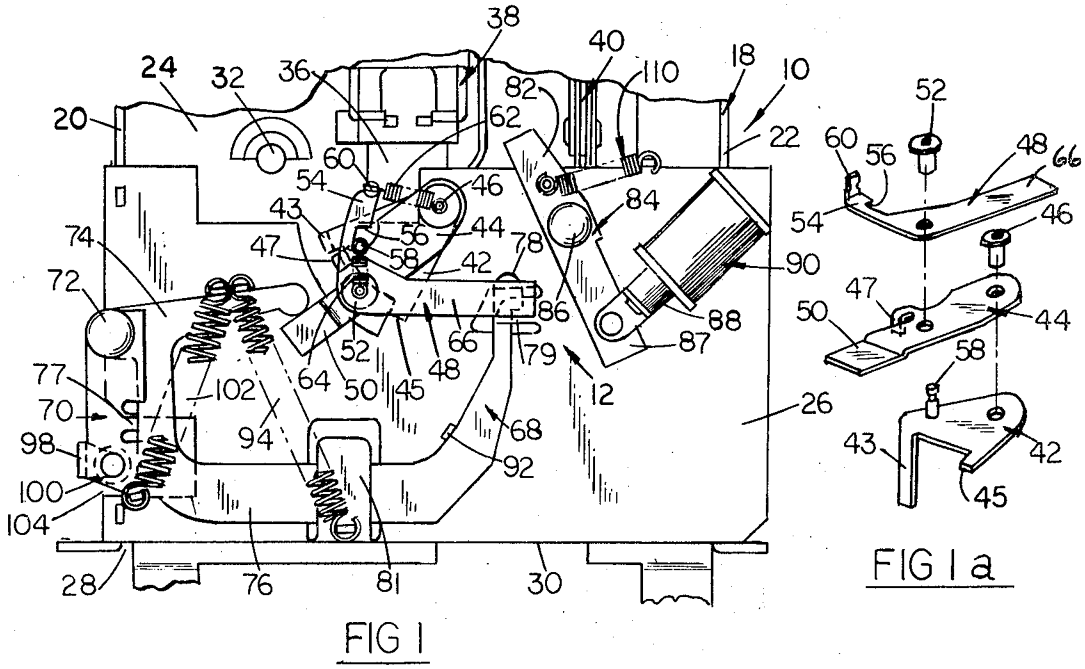
FIG. 1 is a top, plan sectional view of a cartridge tape player incorporating a cartridge locking and ejector mechanism according to the invention.
FIG. 1*a* is an enlarged exploded view of a portion of the mechanical linkage of the cartridge locking and ejector mechanism of FIG. 1.

Referring now to the drawings in greater detail wherein like numerals have been employed to designate similar parts throughout the various views, there is shown in FIGS. 1 and 2–4, a cartridge type tape player 10 incorporating a cartridge locking and ejector mechanism 12 according to the invention.

The tape player 10 is adapted to receive and play a tape cartridge 14 of the usual type having a recorded multi-track tape 15 mounted therein and a V-shaped groove or notch 17 (FIGS. 3 and 4) formed along a side wall 19 thereof.

The tape player 10 includes a chassis 18 having a pair of side walls 20, 22, interconnected by bottom and top walls 24, 26, respectively, to form a cavity or tunnel 28 having a mouth or open end 30 through which the cartridge 14 is received.

Figure 4:
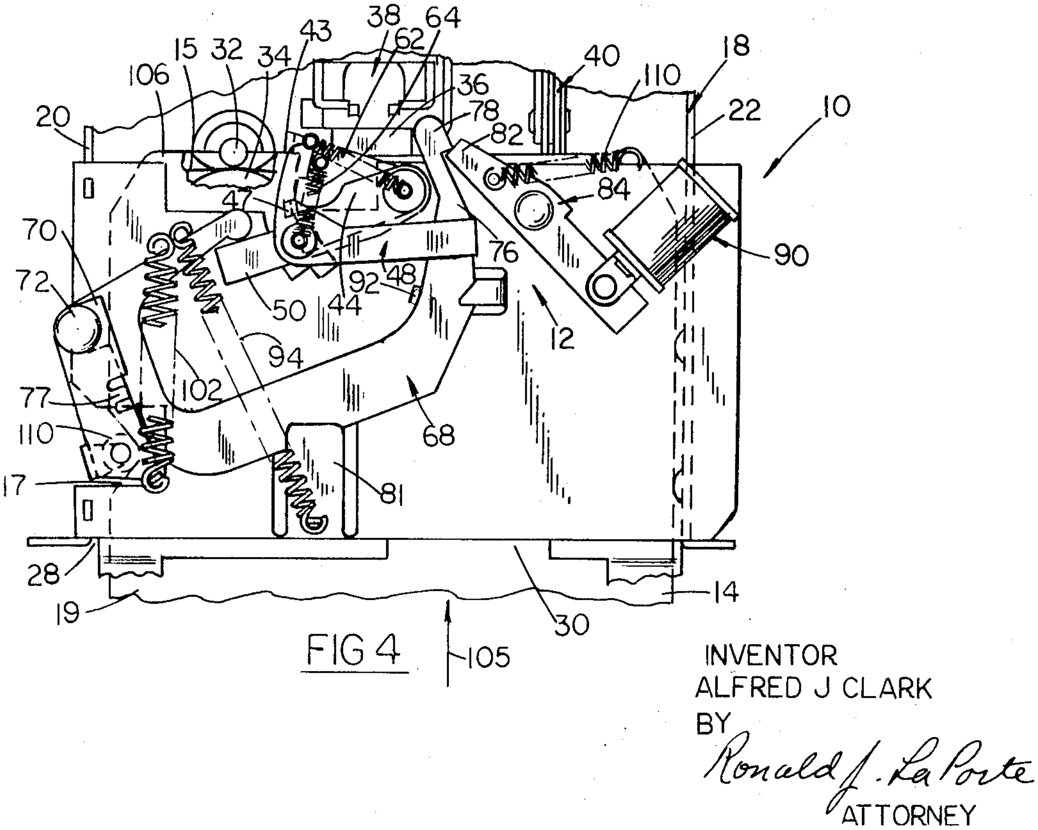

Extending from bottom wall 24 in communication with tunnel 28, is a capstan shaft 32 against which a pressure roller 34 mounted in tape cartridge 14, and over which tape 15 passes, is pressed upon insertion of the cartridge fully into tunnel 28 (see FIG. 4). The capstan shaft 32 is driven in the usual manner by a motor and pulley arrangement (not shown) to move the tape 15, sandwiched between the capstan shaft and the pressure roller, through the cartridge and past a magnetic tape head 36 mounted on chassis 18 in communication with cartridge receiving tunnel 28.

The magnetic tape head 36 is mounted on a suitable bracket arrangement 38 designed to move the tape head in a plane adjacent the tape 15 in a direction transverse the movement thereof for the purpose of selectively playing certain ones of the various tracks on the tape. Apparatus (not shown) is provided to automatically position the magnetic tape head 36 with respect to the various tracks in response to the detection of a conductive strip (not shown) on the magnetic tape, by a set of contacts 40 mounted adjacent tape 15 and in engagement therewith (FIG. 4).

The cartridge locking and ejector mechanism 12 according to the invention is attached to top wall 26 of the tape player 10 and comprises a linkage including first and second arms 42, 44, both mounted pivotally at first ends thereof to the top plate 26 by fastener 46. Arm 42 includes a projection 43 extending downwardly from the free end thereof into the cartridge receiving tunnel 28 (into the page as viewed in FIGS. 1 and 2–4 of the drawings) for engagement with a cartridge inserted thereinto, and a tooth 45 formed at the opposite side of the free end thereof. Arm 44 also includes a small downwardly extending projection 47, which, as will be described hereinafter, engages tooth 45 for ejecting a cartridge from tunnel 28. Arm 42 is sandwiched between plate 26 and arm 44, but both arms are independentaly pivotal about fastener 46.

A third linkage arm 48 is mounted pivotally on arm 44 near the free end 50 thereof by means of fastener 52. Arm 48 includes a first leg 54 extending outwardly from the pivot point 52 toward tape head 36. Leg 54 of arm 48 includes a notch formed therein, normally (when no cartridge is inserted into tunnel 28) receiving a pin 58 extending upwardly from the free end of arm 42, adjacent arm 44. The free end 60 of leg 54 of arm 48 is connected by a spring 62 to the fastener 46. Pin 58 is also connected by a spring 64 to fastener 52 on arm 48. The other leg 66 of arm 48 extends outwardly from fastener 52 at substantially right angles with respect to leg 54.

An ejector arm 68 is pivotally mounted at a first end to the top plate 26 by a fastener 72. A first leg 74 of arm 68 extends outwardly from pivot point 72 toward arm 44 for engagement with end 50 thereof. A second, C-shaped leg 76 extends outwardly from pivot point 72 for movement along a path beneath leg 66 of arm 48 and guide tabs 79, 81 formed in plate 26. The end 78 of leg 76 includes a notch 80 for engagement with the end 82 of an arm 84 pivotally mounted by fastener 86 on plate 26. Arm 84 is also connected pivotally at the opposite end 87 to the armature 88 of a latching solenoid 90.

A pin 92 extending upwardly from leg 76 of arm 68 is provided for engagement with leg 66 of arm 48. A biasing spring 94 connected to leg 74 of arm 68, and to tab 81, maintains arm 68 in a first normal, unlatched position, as shown in FIG. 1. As will be explained in more detail hereinafter, ejector arm 68 is movable about pivot point 72, against the force of biasing spring 94, to a latched position in preparation for the ejection of a cartridge from tunnel 28.

A second arm 70, also mounted at a first end for pivotal movement about fastener 72, includes at the opposite, free end 98 thereof, a roller 100 which, as will be explained in greater detail hereinafter, engages the side wall 19 of cartridge 14 and is received in notch 17 formed therein to maintain the cartridge secured in tunnel 28. A spring 102 connected also to leg 74 of arm 68, is connected to the free end 98 of arm 70 to bias the roller 100 for movement toward aperture 104 in plate 26 and side wall 20 of the chassis. A projection 77, extending downwardly from arm 70, engages the edge of leg 76 of arm 68 to maintain the relative positions of arms 68 and 70.

For purposes of affording a more complete understanding of the invention, it is advantageous now to provide a functional description of the mode in which the component parts thus far described cooperate.

Figure 2:
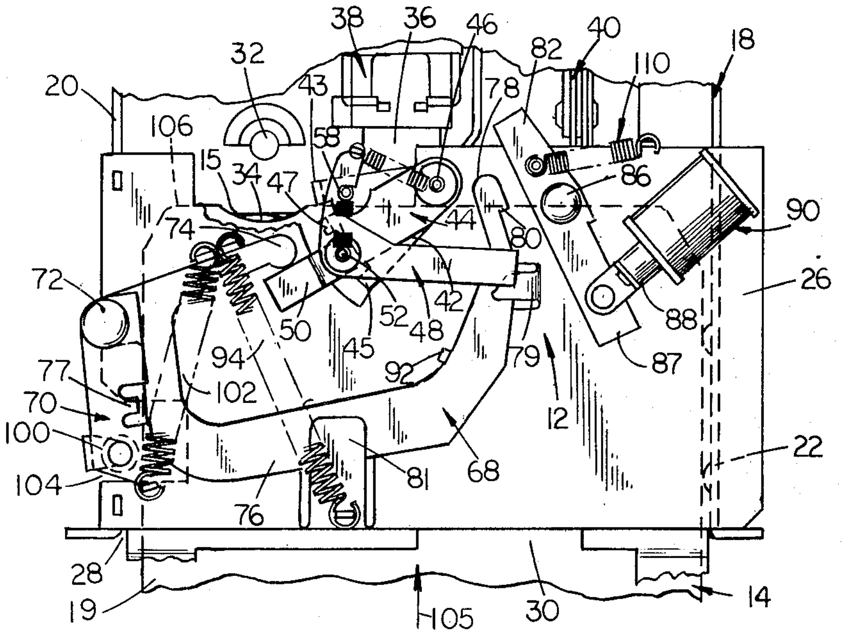
FIGS. 2–4 are top plan sectional views of the cartridge locking and ejector mechanism of FIG. 1, illustrating the operating sequence as a tape cartridge is inserted into the tape player.
Figure 3:
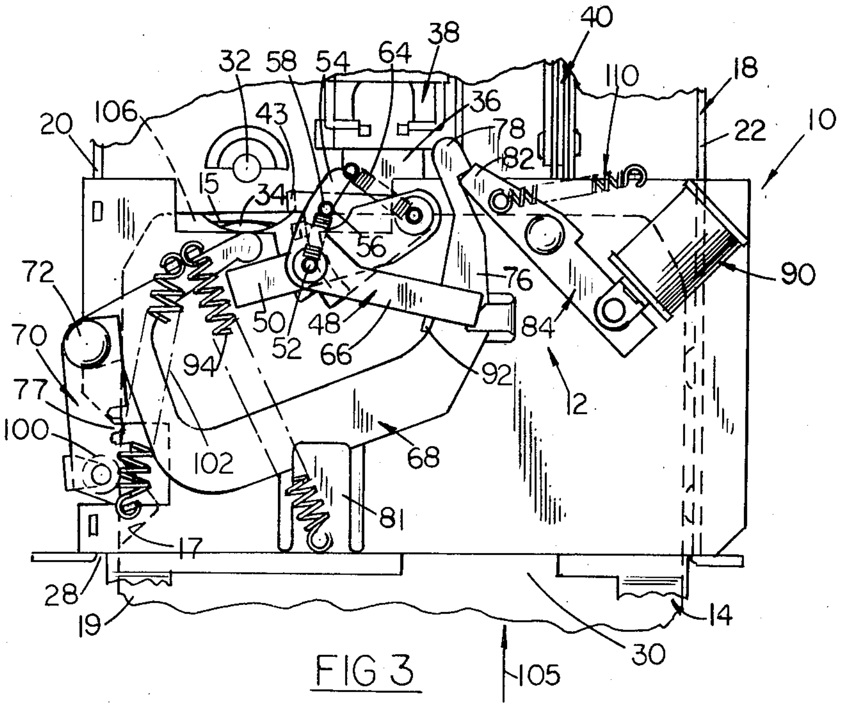

Referring to FIGS. 2–4 of the drawings, it can be seen that upon insertion of a cartridge 14 into the open end 30 of tunnel 28 (in the direction of arrow 105) the leading end 106 (FIG. 2) of the cartridge engages projection 43 of arm 42. Movement of the cartridge into tunnel 28 against projection 43, causes arm 42 to be rotated about fastener 46 in a clockwise direction as shown in the figures.

Rotation of arm 42 moves pin 58 extending upwardly therefrom, into engagement with leg 54 of arm 48, in notch 56, interconnecting the arms and causing arm 44 likewise to be rotated in a clockwise direction about point 46 (see FIG. 2). The end 50 of rotating arm 44 engages leg 74 of ejector arm 68 to in turn rotate arm 68 in a counterclockwise direction about pivot point 72 against the tension of spring 94. Simultaneously, with the rotation of ejector arm 68, and by the force provided by spring 102, arm 70 is rotated in a counterclockwise direction and roller 100 is moved through aperture 104 into tunnel 28 and rolling engagement with side wall 19 of cartridge 14.

Solenoid 90 is at this time, in the unoperated condition (see FIGS. 1 and 2), permitting end 78 of leg 76 of the ejector arm to be moved past end 82 of arm 84. Once end 78 is moved past end 82 of arm 84, the solenoid 90 is energized, pulling in armature 88 to pivot arm 84 about point 86 against the force of release spring 110 connected to the chassis 18 and to end 82 of arm 84. The operation of solenoid 90 moves arm 84 into engagement with leg 76 of arm 68 at notch 80, securing the last mentioned arm in a latched position as shown in FIG. 3.

The operation of solenoid 90 at the proper time during the insertion of cartridge 14 into tunnel 28 to latch ejector arm 68 as described, may be accomplished in a variety of ways, any number of which will be apparent to one skilled in the art. One such method, for example, would be to provide a switch mechanism operable in response to the rotation of arm 68 beyond a point whereat end 82 of arm 84 can be engaged therewith. The switch would be connected electrically to solenoid 90 to cause the the energization thereof at the precise time described.

As illustrated in FIG. 3 of the drawings, at the time that leg 76 of arm 68 is latched, cartridge 14 has not yet reached its fully inserted position, and roller 100 has not as yet been received in notch 17 of side wall 19 of the cartridge. Full insertion of cartridge 14 into tunnel 28 causes pin 92 on leg 76 of arm 68 to engage leg 66 of arm 44 (FIG. 3) so that the last mentioned arm is rotated slightly about point 52 against the tension of spring 62. The rotation of arm 44 permits pin 58 captured in notch 56 of leg 54, to be freed therefrom, disconnecting arms 42 and 44. This permits arm 42 to be rotated additionally in the clockwise direction by the continued insertion of cartridge 14 until the cartridge reaches its fully inserted position. Upon reaching such a position, roller 100 is pulled rapidly by spring 102 into groove 17 in the cartridge side wall (FIG. 4). Ejector arm 68 remains in a latched position with respect to arm 84 of the latching solenoid 90.

The cartridge 14, as shown in FIG. 4, is inserted fully into tunnel 28 so that capstan 32 and tape head 36 are in contacting engagement with tape 15 to drive and play the latter, respectively. The cartridge is maintained secured in the position shown in FIG. 4 by the force of roller 100 thereagainst. This force is maintained so long as solenoid 90 is energized.

In the event electrical power to the tape player is removed such as for example when the tape player on-off switch is moved to the off position or as in the case of a player mounted in an automobile, when the ignition switch is turned off, solenoid 90 is deenergized.

In response to the deenergization of solenoid 90, the release spring 110 attached to arm 84, moves the arm quickly away from leg 76 of arm 68. The latter permits spring 94 to pull with considerable force against ejector arm 68, causing it to rotate in a clockwise direction. The rotation of arm 68 performs two functions substantially simultaneously; the first being to move leg 74 against end 50 of arm 44, to rotate arm 44 in the counterclockwise direction as seen in the drawings. Projection 47 on arm 44 engages the tooth 45 of arm 42 (see FIG. 1*a*) rotating the last mentioned arm also. The rotational movement of arm 42 drives projection 43 against the front wall or edge 106 of cartridge 14, moving the cartridge rapidly out of tunnel 28. The second function performed by the rotation of arm 68 is to move roller 100 out of notch 17 in the cartridge wall thereby to eliminate any resistance against the driving force of spring 94 used to eject cartridge 14 from the tunnel 28. The latter is accomplished through the engagement of leg 76 with projection 77 on arm 70, to cause arm 70 to be rotated in a clockwise direction with arm 68, removing roller 100 from notch 17.

Thus, the cartridge locking and ejector mechanism according to the invention provides an efficient means to firmly secure a tape cartridge in a tape player so long as power is provided to the player, and to eject the cartridge from the player upon removal of the power, thereby performing the ejection process without the requirement of a source of electrical energy connected thereto. Consequently, in the case of a tape player mounted in an automobile, the cartridge is ejected automatically upon turning the ignition switch or the power switch to the player to the off position, thereby preventing the need for a source of electrical energy to be connected to the player when the automobile or player is not in use. In addition to the above, the automatic ejector mechanism according to the invention likewise prevents damage, such as flat spots, etc. to the pressure roller in a tape cartridge inadvertently left in the play position in a tape player after the player is rendered inoperative.

While a particular embodiment of the invention has been shown and described, it should be understood that the invention is not limited thereto since many modifications thereof may be made. It is therefore contemplated to cover by the present application any and all such modifications as fall within the true spirit and scope of the appended claims.

I claim:

1. A cartridge locking and ejector mechanism for a cartridge type tape player having a cartridge receiving tunnel and instrumentalities communicating with said tunnel for driving and playing a tape in said cartridge when the latter is inserted fully into said tunnel, said locking and ejector mechanism comprising: an ejector arm, movable between first and second positions; biasing means resiliently biasing said ejector arm toward said first position, linkage means coupled with said ejector arm and including means engageable with a cartridge inserted partially into said tunnel for movement from a first to a second position, to in turn move said ejector arm against said biasing means to said second position, said cartridge engaging means being movable to a third position in response to the full insertion of said cartridge into said tunnel, means coupled to said ejector arm for engaging said cartridge to maintain the latter in said fully inserted position in said tunnel, and release means for releasing said ejector arm, whereby said biasing means returns said ejector arm to said first position causing said cartridge engaging means to eject the cartridge from the tunnel.

2. A cartridge locking and ejector mechanism as claimed in claim 1 wherein said release means includes a solenoid operated arm member, said solenoid being energizable to move said arm member into engagement with said ejector arm upon the latter being moved to said second position, and being deenergizable to move said arm member away from said ejector arm to release the latter for ejecting said cartridge from the tape player.

3. A cartridge locking and ejector mechanism as claimed in claim 1 wherein said linkage means include an arm member mounted for pivotal movement about a predetermined pivot point, said arm member having a projection extending into said tunnel in the path of a cartridge received therein.

4. A cartridge locking and ejector mechanism as claimed in claim 3 wherein said linkage means further include a second arm member mounted for pivotal movement about said predetermined pivot point and engageable with said ejector arm, and means interconnecting said arm members so that upon insertion of a cartridge into said tunnel in engagement with said first mentioned arm member, said second arm member moves said ejector arm to said second position, said interconnecting means releasing said first mentioned arm member for additional movement in response to the full insertion of said cartridge into said tunnel subsequent to said ejector arm being placed in said second position.

5. A cartridge locking and ejector mechanism as claimed in claim 1 wherein a wall of said cartridge includes a notch formed therein and wherein said means coupled to said ejector arm for engaging said cartridge includes a resiliently biased arm member having a roller mounted on one end thereof for engagement with said wall and for receipt in said notch.

6. A cartridge locking and ejector mechanism as claimed in claim 4 wherein said interconnecting means includes a third arm member mounted on said second arm member for pivotal movement and including means for engaging said first mentioned arm member when said cartridge is inserted into said tunnel, said engaging means being disengaged upon full insertion of said cartridge into said tunnel, subsequent to the ejector arm being placed into said second position to permit additional movement of said first mentioned arm member.

7. A cartridge locking and ejector mechanism for a tape player using an exchangeable cartridge, including in combination: a pivotally mounted ejector arm movable from a first to a second position; biasing means resiliently biasing said ejector arm to said first position; means for retaining said ejector arm in said second position, linkage means comprising a first arm mounted for pivotal movement about a fixed pivot point and having a portion thereof in engagement with said ejector arm, a second arm mounted for pivotal movement about said fixed pivot point and including a first projection extending into the path of a cartridge received in said player and a second projection extending adjacent said first arm and a third arm mounted on said first arm for pivotal movement with respect thereto, said third arm receiving said second projection of said second arm to removably interconnect said first and second arms, said first projection of said second arm being engaged by a cartridge inserted into said player to rotate said first arm, thereby to in turn rotate said ejector arm against said biasing means to said second position, said first and second arms being disconnected from each other subsequent to the movement of said ejector arm to said second position and in response to the full insertion of said cartridge into said player; and means for engaging said cartridge to maintain the latter in a fully inserted position in said player upon insertion of said cartridge to said fully inserted position, said retaining means being releasable to permit movement of said ejector arm from said second to said first position, thereby to eject said cartridge from said player.

8. A cartridge locking and ejector mechanism as claimed in claim 7 wherein said cartridge includes a notch formed in a wall thereof and wherein said means for engaging said cartridge includes a roller mounted on an arm resiliently biased toward said ejector arm, said arm being pivotally mounted about a point about which said ejector arm is also pivotally mounted, said roller being moved into rolling engagement with said wall of said cartridge as said ejector arm is moved from said first to said second position and being received in said notch upon fully inserting said cartridge into said player.

9. A cartridge locking and ejector mechanism as claimed in claim 7 wherein said ejector arm retaining means comprise a pivotally mounted arm member movable from a first position whereat said arm member engages said ejector arm when the latter is moved to said second position, to a second position whereat said arm is disengaged from said ejector arm.

10. A cartridge locking and ejector mechanism as claimed in claim 9 wherein said ejector arm retaining means include a solenoid having an armature attached to said arm member, said solenoid being energized to move said arm member to said first position and deenergized to move said arm member to said second position.

11. A cartridge locking and ejector mechanism as claimed in claim 7 wherein said second arm member of said linkage means includes a tooth and wherein said first arm member of said linkage means includes a projection engageable with said tooth upon release of said ejector arm, thereby to cause the ejection of said cartridge from said player.

12. A cartridge locking and ejector mechanism for a tape player using an exchangeable cartridge, including in combination: ejector means movable from a first to a second position, biasing means resiliently biasing said ejector means to said first position, latching means for securing said ejector arm in said second position, linkage means engageable with said ejector means, said linkage means being movable from a first to a second position in response to the insertion of a cartridge into said tape player to move said ejector means against said biasing means to said second position, said linkage means being movable from said second to a third position, subsequent to moving said ejector means to said second position thereby to permit the full insertion of a cartridge into said player, and means for engaging said cartridge upon insertion of said cartridge to said fully inserted position, to maintain the latter in said fully inserted position in said player, said ejector means moving from said second to said first position, in response to the release of said latching means causing the ejection of said cartridge from said tape player.

* * * * *